Figure 1:
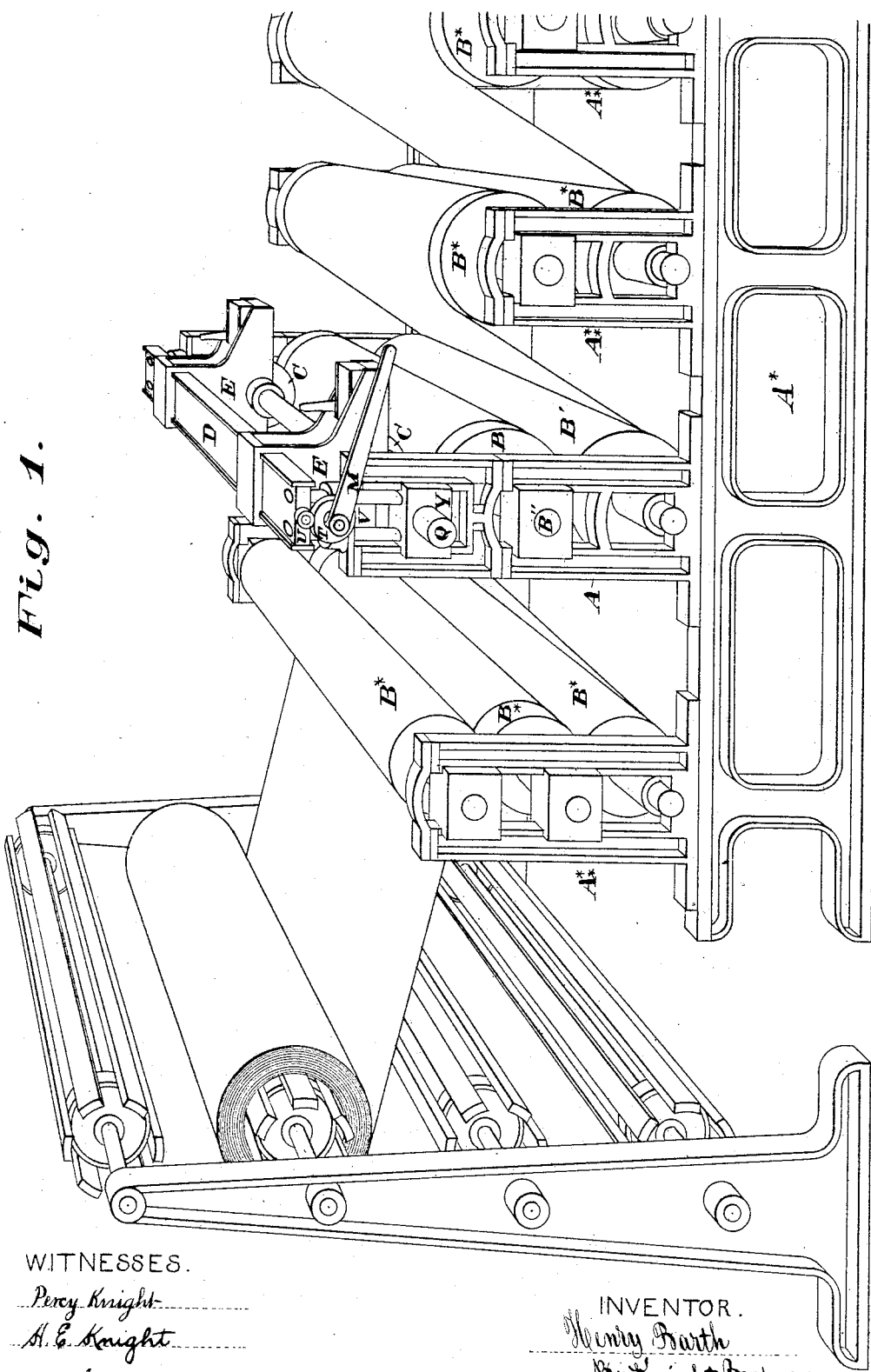

(No Model.) 4 Sheets—Sheet 1.

H. BARTH.
MEASURING DEVICE FOR PAPER MAKING MACHINES.

No. 288,295. Patented Nov. 13, 1883.

WITNESSES.
Percy Knight
A. E. Knight

INVENTOR.
Henry Barth
By Knight Bros Attys.

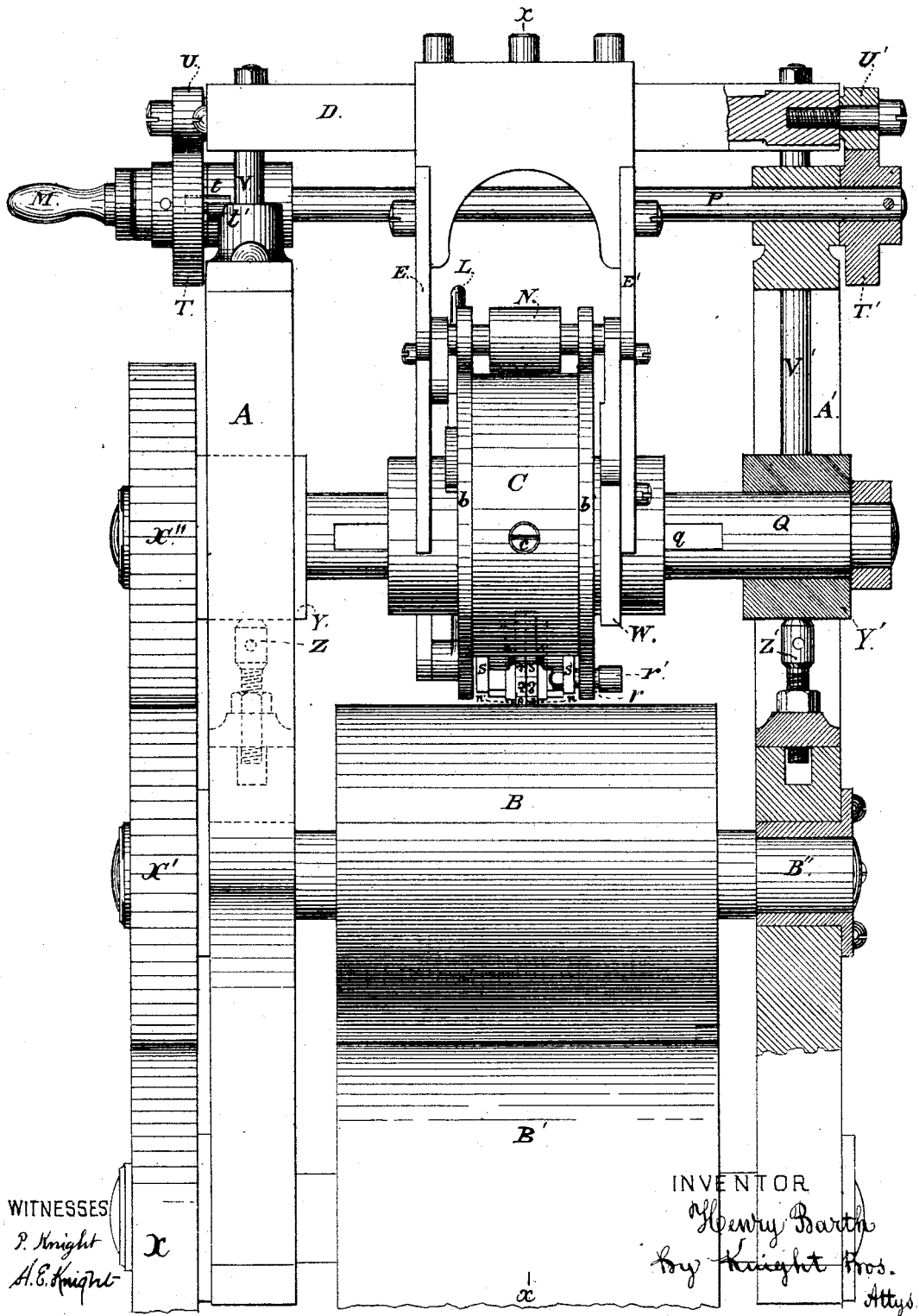

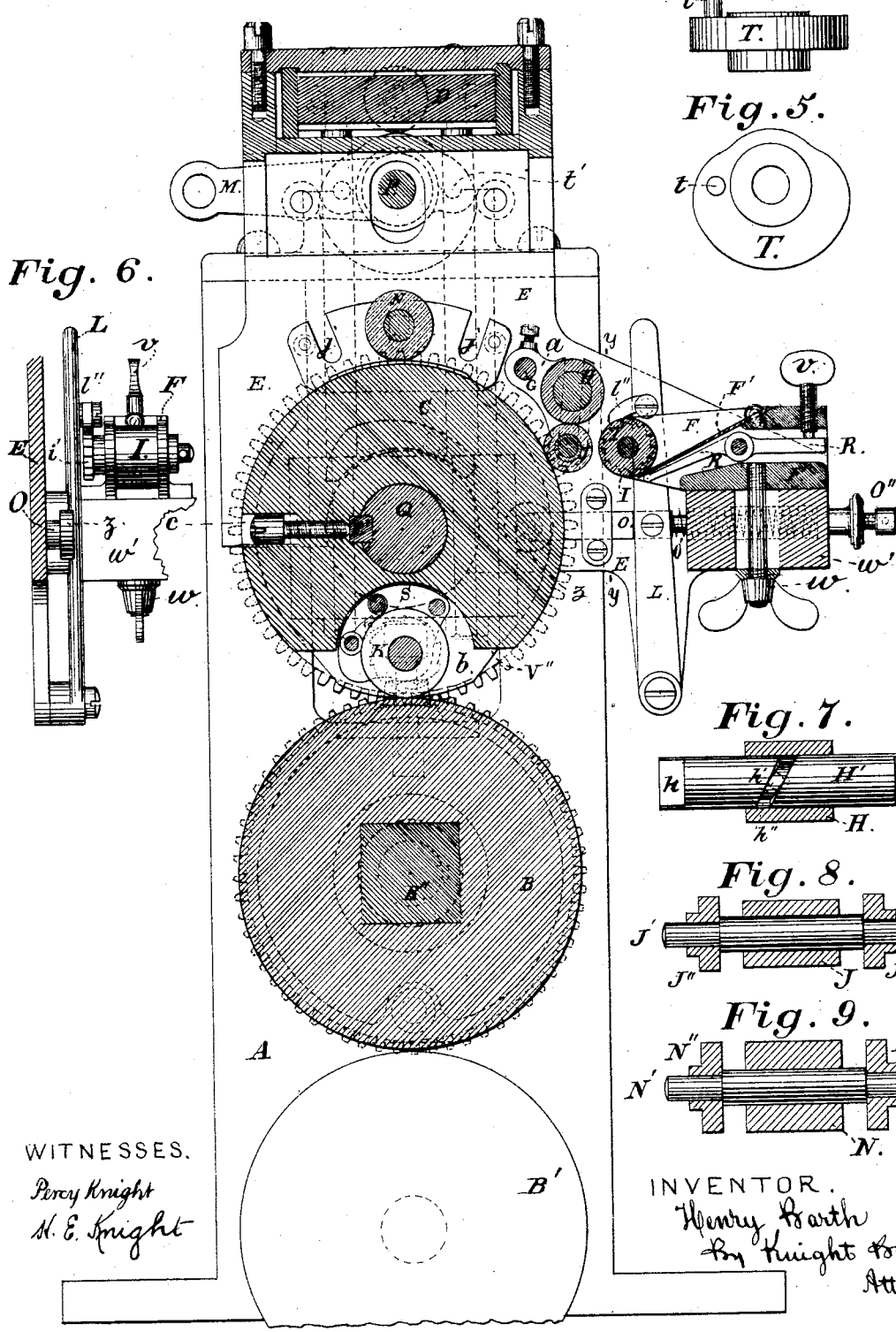

(No Model.) 4 Sheets—Sheet 4.
H. BARTH.
MEASURING DEVICE FOR PAPER MAKING MACHINES.
No. 288,295. Patented Nov. 13, 1883.
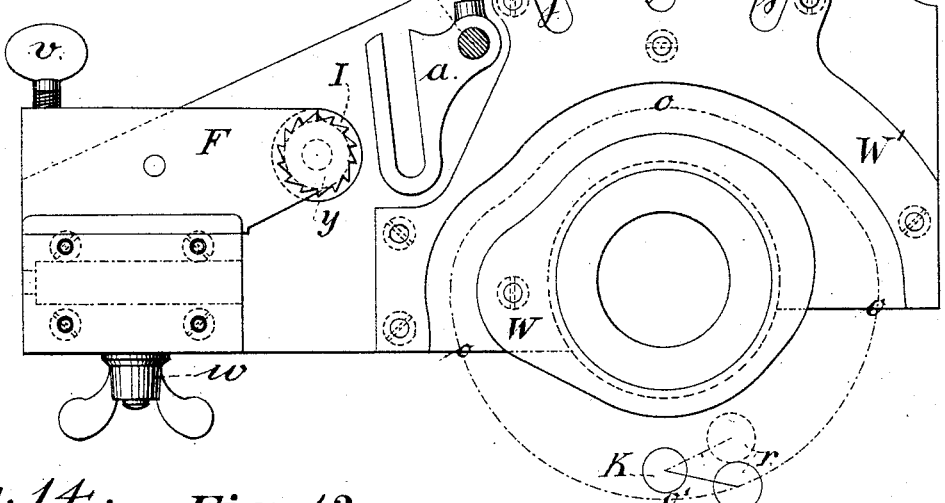
WITNESSES.
P. Knight
H. C. Knight
INVENTOR.
Henry Barth
By Knight Bros
Attys

UNITED STATES PATENT OFFICE.

HENRY BARTH, OF CINCINNATI, OHIO.

MEASURING DEVICE FOR PAPER-MAKING MACHINES.

SPECIFICATION forming part of Letters Patent No. 288,295, dated November 13, 1883.

Application filed October 11, 1880. (No model.)

*To all whom it may concern:*

Be it known that I, HENRY BARTH, a citizen of the United States, residing at Cincinnati, in the county of Hamilton and State of Ohio, have invented a new and useful Device for Imprinting Linear Measurements upon Paper in the Process of its Manufacture, of which the following is a specification.

My invention relates to a mechanical device adapted to constitute an integral part, member, or adjunct of a Fourdrinier or other like machine for making roll or continuous paper, whereby the web or sheet, in process of manufacture, becomes imprinted with one or more series of equidistant consecutive numerals in direction of its length. In my improvement the printing is effected by an equable and constant rotation of the type-bearing cylinder, (whose circumference is precisely that of the required measurement,) in continuous contact with a uniformly and correspondingly advancing web, supported upon one of the customary steam-heated calenders, to whose peripheral motion that of the said type-bearing cylinder corresponds.

In the accompanying drawings, Figure 1 represents a portion, near its delivery end, of a Fourdrinier or like paper-making machine embodying that form of my improvement which prints two lines of consecutive numbers. Fig. 2 is a transverse sectional elevation, to a larger scale, of that form of my device which prints a single line of numerals. Fig. 3 is a section on the line $x\, x$. Figs. 4 and 5 are respectively an edge view and profile of my printing mechanism disengaging-cam. Fig. 6 is a section on the line $y\, y$ of Fig. 3, giving a rear elevation of my ink-supplying mechanism. Fig. 7 shows my distributing-roller in section upon its obliquely-grooved shaft. Fig. 8 is a longitudinal section of the dip-roller and its guide-wheels upon their shaft. Fig. 9 is a longitudinal section of one of my type-inking rollers (which are three in number) and of its guide-wheels upon their shaft. Fig. 10 is an elevation of one of the cheeks or bearing-plates of my ink-supplying mechanism, and of the cam-groove which operates my type-shifting mechanism. Figs. 11 and 12 are respectively an end view and an axial section of my type-bearing or imprinting cylinder. Fig. 13 shows one of the bearing-plates of my numbering mechanism detached. Fig. 14 is an under side view of my numbering mechanism. Fig. 15 is a vertical section of the same on the line $z\, z$. Fig. 16 is a transverse section of one of the numbering-wheels.

The customary appliances for admitting steam to the interior of the calender-cylinders are omitted from the drawings.

$A^*$ may represent a portion of any suitable base or bed-frame of a machine of the Fourdrinier or like type for the manufacture of continuous paper.

$A^{**}$ may represent customary standards or housings for the ordinary series of steam-heated cylinders or calenders, $B^*$, of a paper-making machine.

The housings A of one pair of calenders, B B', at or near the delivery end of the paper-making machine, are in excess of the usual height, either by the addition of superimposed housing-extensions, as in Fig. 1, or by the housing being cast in one integral piece of the requisite height at that part, as in Figs. 2 and 3. The purpose of such upward prolongation of these particular housings is to afford journal-bearing for the shaft Q of one or more type-bearing cylinders, C, which, in their operative positions, as shown in the drawings, rest vertically over and upon the upper calender or calendering cylinder, B, at that part of the machine. The three cylinders B, B', and C are caused to revolve in peripheral isochronism by means of geared connection $x$ $x'$ $x''$ of their shafts.

A screw, $c$, that is tapped into the imprinting-cylinder C, presses on a tongue or feather, $e'$, which, occupying a groove, $q$, in the shaft Q, serves to retain the imprinting-cylinder to any longitudinal position upon its shaft Q, and to compel its rotation therewith.

The journal-boxes Y Y' of the imprinting-cylinder rest upon adjustable bearings Z Z', which, being screwed up or down, serve to regulate the type-pressure.

Hangers V V', which depend from a beam or cross-head, D, capable of vertical movement in the housings, engage at their lower ends within and are secured by nuts V''' to the journal-boxes Y Y'.

The cross-head D carries at its extremities rollers U U', that rest upon cams T T' upon a shaft, P, which, by means of a handle, M, can be semi-rotated, so as either to take the position shown, which permits the printing mechanism proper to occupy its lower and effective place, or to take a position in which the said cams lift the printing mechanism out of action. Each cam has a projection, $t$, which, coming to rest in one or other of two sockets, $t'$, holds the cams and their dependent printing mechanism to the desired elevated position, or suffers them to assume their lower and effective position, as here shown. This provision enables the attendant to commence and to terminate the measure-marks at any desired points on the moving web.

Attached to and depending from the cross-head D are the cheek-plates E E', which contain the ink-supplying mechanism, which will be described in the sequel.

The imprinting-cylinder C is excavated on one side, as shown in Fig. 3, to receive my automatically-shifting type mechanism, which is constructed as follows: Screwed fast to the ends of the cylinder C are two cheek-plates, $b$, of which each plate, besides constituting part of the cam $b$ $b'$ $b''$ that controls the dip and type-inking rollers, also receives the stationary shaft or axle K on which my "unit" and "ten" type-wheels $n$ and $n'$, and their respective ratchets, $l$ $l'$, rotate, and upon which the operating-arms S vibrate. For this purpose said shaft K is screwed fast in one of the cheeks, $b$, as shown. The shaft K has ten equidistant longitudinal grooves, $k$, that receive the points of two spring-pawls, $u$, of which one is pivoted within each type-wheel. The purpose and effect of these pawls and grooves are to bring and hold each respective type-wheel to its precise adjustment for the proper presentation of the successive digits at each recurring rotation of the imprinting-cylinder. The two pawls $p$ and $p'$ are rigid projections from the same shaft, $p''$, and have such angular divergence that only the "units-pawl" is able to enter its ratchet except once in each revolution, as shown in Fig. 15, in which a deeper indentation in the "units-ratchet" permits the "tens-pawl" to engage for the moment in its proper ratchet, causing both type-wheels to be advanced one digit, after which the "units-wheel" is alone advanced until the same place in the "units-circuit" is again reached. The said shaft $p''$ and a bar, $m$, unite rigidly to one another the two arms S S'.

The above-mentioned recurrent advance of the type-wheels is accomplished through the agency of a wrist, $r$, having a roller, $r'$, which, by each successive rotation of the cylinder C, is caused by the stationary cam-groove $o$ to vibrate sufficiently backward and forward to advance one or both type-wheels, as the case may be, the distance between two consecutive digits. The degree of angular motion thus imparted to wrist $r$ is indicated by diagram at $o'$ in Fig. 10. A slot, $b'''$, in plate $b$ permits of the above vibrations of wrist $r$. The mechanism which supplies ink to my said self-shifting number-wheels is constructed as follows: Attached by screw $w$ to beam $w'$, connecting together the two pendent cheeks E E', is the frame F of my ink-fountain, the floor of which is composed of a steel plate, F', and one side of it of the ink-fountain cylinder I. The floor F' is so attached as to slope downward toward said cylinder and nearly to touch its lower periphery, with which it is brought into more or less intimate contact by means of a lever, R, the pressure of which is regulated by a temper-screw, $v$. The ink-fountain cylinder I has a ratchet, $i$, which receives a pawl, $l''$, upon a lever, L, which is vibrated automatically by the machine, but which is also capable of being manipulated by the person in charge. This lever bears against a slide, O, whose inner extremity has a roller, $z$, which at a certain part of the revolution of the imprinting-cylinder C is pressed backward by cam $d$ upon said cylinder, causing the pawl $l''$ to draw back and propel ratchet $i'$, so as to draw out a portion of ink from the fountain and expose the same on the rear side of the cylinder I. On release of these members from the action of the cam $d$ they are restored to their normal positions (see Fig. 3) by the action of a spring, O'. An adjustable stop, O'', enables the attendant to increase or diminish at will the stroke of the said lever and pawl, and consequently the movement of the cylinder I, and to thus regulate the delivery of ink to the printing-surfaces.

Dependent from shaft G, that extends athwart the pendent frame E E', are two slotted hangers, $a$, the bottom of whose slots affords journal-bearing for shaft J' of dip-roller J. The upper portion of same slot receives the flattened extremities $h$ of stationary shaft H', having oblique groove $h'$, which receives the pin $h''$, that projects interiorly from my annular distributing-roller H. The rotation of the roller J operates on the impinging-roller H to cause the latter to revolve, and the occupancy by pin $h''$ of oblique groove $h'$ in stationary shaft H' causes any rotation of roller H to be accompanied by a longitudinal reciprocation of said roller, which enables it to distribute the ink equally over the entire periphery of the dip-roller. From the dip-roller J ink passes to the contiguous ink-surfaces $f$ $g$ $h$ $i$ of the impression-cylinder C, and from these surfaces to one or more type-inking rollers, N, which in turn impart it to the type-faces preparatory to each impression. Twice in each rotation the dip-roller is pressed toward and in contact with the ink-fountain cylinder I, so as to take up a modicum of ink therefrom. This movement is effected by contact of the cams $b$ and $b''$ with the wheels J'' of said dip-roller. Similarly, and by the same means, the type-inking rollers N are by the contact of cams $b$ with wheels N'' on shaft N' sufficiently lifted to bear with the proper pressure, and no more, upon the type-faces.

In consequence of the considerable heat to which the parts are subjected the dip and inking rollers J and N, instead of the usual "composition," are of metal enveloped in leather.

The printing-pressure being due to the weight of the cylinder C and its described movable appendages, regulated by the gages Z Z', is capable of yielding or advancing to suit diverse thicknesses of paper without injury to the type or to the paper itself.

I am aware that a printing mechanism for printing newspapers and like matter has been combined with, introduced into, and made a part of a paper-making machine or apparatus; and I am also aware that finished paper has been passed through a separate and independent measuring and measure-marking machine, and I make no claim to either of these arrangements. I am not, however, aware that it has ever before been proposed to introduce into a paper-making machine a measuring and measure-marking apparatus as an integral and co-operating part of the complete machine, by which combination the paper may be manufactured, measured, marked, dried, and delivered complete, ready for sale as it comes from the paper-making machine. Such machines as before referred to, in which the surfaces of the paper were printed in the process of drying, and by an integral part of the complete machine, were not designed to secure, and could not secure, the result I attain, for the reason that they contained no measuring-cylinder—that is to say, no cylinder whose circumference represented a recognized standard unit of measure; and such other machines, above referred to as measure the paper and mark it after it has left the paper-making machine require independent propelling mechanism, separate and independent machinery, special manipulation and attention, and additional space, each and all of which considerations add to the expense of the operation, and in many cases render it wholly impracticable, not only by reason of the great expense involved, but also because there frequently is no available space for such additional machinery. My apparatus can be applied to and made a part of machines already in use without taking up any floor-space whatever, and is simple, cheap, and efficient.

Having thus described my invention, the following is what I claim as new therein and desire to secure by Letters Patent:

1. In an organized machine for manufacturing, measuring, and marking paper, the combination of drying-rolls, over which the web or sheet passes as it is formed, and a roll having a circumference equal to a recognized unit of measure, and provided with a marking device, said measuring-roll being arranged, substantially as shown and described, to bear against the paper lying upon one of the drying-rolls and to be rotated thereby, whereby the rotation of the drying-roll is caused to operate the measuring-roll.

2. In an organized machine for manufacturing, measuring, and marking units of measure upon paper, the combination of a series of drying-rolls, and a cylinder provided with a marking device and having a circumference equal to a recognized unit of measure, said cylinder being introduced into the series of drying-rolls at an intermediate point in the series, whereby it is caused to imprint the numbers upon the paper while in a moist state, and whereby the printing is caused to be dried by the subsequent rolls before the paper is wound into a roll.

3. In a paper making, measuring, and marking machine, the combination of a web-producing apparatus, a series of drying-rolls, and a measuring-roll provided with a marking device, substantially as shown and described.

4. In combination, in paper-making machines, a marking-cylinder, C, and the described cams $b\ b'\ b''\ d$, the inking mechanism having the ink-surfaces $f\ g\ h\ i$, the type-inking rollers N, the dip and distributing rollers J H, the ink fountain and cylinder F I, and the adjustable ink-feed mechanism $v$ R F' L $l''$ O O' O'' $z$, substantially as set forth.

In testimony of which invention I hereunto set my hand.

HENRY BARTH.

Attest:
 GEO. H. KNIGHT.
 J. L. LOGAN.